Patented July 31, 1928.

1,679,312

UNITED STATES PATENT OFFICE.

GUSTAVE E. LANDT, OF NORRISTOWN, PENNSYLVANIA, ASSIGNOR TO DIAMOND STATE FIBRE COMPANY, OF BRIDGEPORT, PENNSYLVANIA, A CORPORATION OF DELAWARE.

SYNTHETIC RESIN AND METHOD OF MAKING SAME.

No Drawing.   Application filed February 7, 1927.   Serial No. 166,597.

My invention relates to a new synthetic resin and method of making the same and more particularly to that class of synthetic resins known as phenolic condensation products.

A feature of my invention is the employment in the manufacture of phenolic condensation products of a reactant not heretofore used, the use of which not only finishes a much improved method of preparation of these resins but also results in a product of markedly improved and desirable properties.

A further object of my invention is to provide an initial condensation product which will be more easily transformed from the soluble stage to the infusible, insoluble final product and which, when in the initial stage, will be more soluble in the organic solvents and in general will be more easy to manipulate.

Another object of my invention is to provide a final material of the class described which will be considerably harder and more brittle than any heretofore prepared and which will contain no inert or unreacted compounds, such as are now found in synthetic resins, to detract from the properties desired in the product.

Phenolic condensation products are at present prepared by reacting phenol or cresol with a second compound which may be any one of a wide variety of substances. The classic example of a phenolic condensation product is the so-called phenol-formaldehyde resin, in the formation of which phenol is reacted with formaldehyde. In place of formaldehyde, other aldehydes, ketones, sawdust, glycerine and the like have been suggested and used, and regardless of the nature of these second reactants, the product is known as a phenolic condensation product. These compounds are reacted with or without a catalyst to form an initial condensation product which is fusible and soluble in organic solvents and which is known as the potentially reactive resin. This potentially reactive resin is capable of further conversion, in the presence of heat either with or without a hardening agent such as hexamethylenetetramine, into the so-called final stage in which the resin is both insoluble and infusible. At the present time, both the potentially reactive resin and the final resin contain unreacted phenolic bodies incapable of further conversion into the hard, infusible resin. These unreactive resins materially interfere with the conversion of the initial resin into the final stage and markedly affect the solubility of the initial resin in the organic solvents used in the varnish industry. This unreactive material in the final resin lowers the infusibility of the resin, renders the resin less homogeneous in structure and detracts from the hard and brittle nature so desirable in a synthetic resin.

My invention is characterized by the use of a xylenol or a mixture of xylenols in place of the phenol or cresol now used. The xylenols may be reacted with any of the compounds used as the second reactants in the preparation of phenolic resins. When xylenols are used according to this invention an initial condensation product results which is practically free from the unreacted and inert material and hence a product is obtained which is more easily and uniformly soluble in the various organic solvents used in the varnish industry and which can be converted into the final stage in less time, with less heat and hardening agent than has heretofore been possible. Furthermore, the initial product can be more accurately and exactly molded and the final stage, that is to say the hard, infusible, insoluble resin, is of a more uniform structure and possesses exceptional hardness and brittleness.

Any of the xylenols or a mixture of any or all of them are applicable for my invention. I prefer to use, however, the xylenols having the higher boiling points and the use of a mixture of the three compounds with the highest boiling points is exceptionally advantageous, such xylenols being (1, 2) (3); (1, 2) (4); (1, 3) (5) or as they are otherwise known 1:2 dimethyl 3 hydroxy benzene, 1:2 dimethyl 4 hydroxy benzene, 1:3 dimethyl 5 hydroxy benzene whose boiling points are respectively 218° C., 222° C., and 219.5° C. As hereinbefore pointed out, the xylenols may be reacted with any of the second reactants used in the preparation of phenolic condensation products, for example formaldehyde, acetaldehyde, paraformaldehyde, glycerine, hexamethylenetetramine, furfural, sawdust, etc., etc.

In a typical case, I react 100 parts of a xylenol or a mixture of them with 60 parts of a 40% solution of formalin in the presence of 3 parts of ammonia. The reaction is carried on for 3 hours by distillation under a reflux condenser after which the reaction product is distilled in vacuo until all the water and unreacted components have been removed and the resin is in a suitable form, to wit the initial condensation product, for commercial use. In place of the ammonia, other catalysts may be used, such as acids, salts or other bases and in fact the reaction may be carried out without any catalyst whatsoever. Likewise, the reaction may be carried out under pressure in an autoclave or the mixture may be boiled under vacuum and the vapor returned by means of a reflux condenser. This initial condensation product is capable of being converted into the final product and may, for example, be subjected to hydraulic pressure in a mold at a temperature corresponding to 125 pounds of steam and a pressure of 1,000 pounds per square inch. If it be desired to accelerate the rate of conversion, the initial condensation product may be admixed with a hardening agent, such as hexamethylenetetramine or anhydro formaldehyde aniline, and thereafter treated under heat and pressure as described above. The initial product may also be dissolved in an organic solvent and used as a varnish either per se or in the manufacture of laminated work. The product may, in fact, be used in any other way the phenol-formaldehyde reaction product is used.

Considerable modifications in the methods of preparing the material, in the proportions used, and in the methods of using the same are possible with no departure from the essential features of my invention.

I claim:

1. The process of making a synthetic resin which comprises causing substantially pure xylenol to react with a second reactant of the type that is used in the preparation of phenolic resins to give an initial condensation product which is capable of being converted by further heating into a hard, infusible, insoluble resin.

2. The process of making a synthetic resin which comprises causing substantially pure xylenol to react with a compound having an aldehyde group to give an initial condensation product which is capable of being converted by further heating into a hard, infusible, insoluble resin.

3. The process of making a synthetic resin which comprises causing formaldehyde to react with substantially pure xylenol to give an initial condensation product which is capable of being converted by further heating into a hard, infusible, insoluble resin.

4. The process of making a synthetic resin which comprises causing substantially pure xylenol and a second reactant of the type that is used in the preparation of phenolic resins to react to form an initial condensation product and thereafter further heating the compound to form a hard, infusible, insoluble resin.

5. The process of making a synthetic resin which comprises causing substantially pure xylenol and an aldehydic compound to react to form an initial condensation product and thereafter further heating the compound to form a hard, infusible, insoluble resin.

6. The process of making a synthetic resin which comprises causing substantially pure xylenol and formaldehyde to react to form an initial condensation product and thereafter further heating the compound to form a hard, infusible, insoluble resin.

7. An initial condensation product resulting from the reaction between a second reactant of the type that is used in the preparation of phenolic resins and substantially pure xylenol which is capable of transformation into a hard, infusible, insoluble resin by further heating.

8. An initial condensation product resulting from the reaction between an aldehydic compound and substantially pure xylenol which is capable of transformation into a hard, infusible, insoluble resin by further heating.

9. An initial condensation product resulting from the reaction between formaldehyde and substantially pure xylenol which is capable of transformation into a hard, infusible, insoluble resin by further heating.

10. A hard, infusible synthetic resin being the final reaction product obtained by further heating the initial condensation product obtained by reacting a second reactant of the type that is used in the preparation of phenolic resins and substantially pure xylenol.

11. A hard, infusible synthetic resin being the final reaction product obtained by further heating the initial condensation product obtained by reacting an aldehydic compound and substantially pure xylenol.

12. A hard, infusible synthetic resin being the final reaction product obtained by further heating the initial condensation product obtained by reacting formaldehyde and substantially pure xylenol.

GUSTAVE E. LANDT.